United States Patent [19]

Rodrigues-Ely

[11] Patent Number: 5,423,247

[45] Date of Patent: Jun. 13, 1995

[54] ENVIRONMENTAL STEAM ENERGY STORAGE

[76] Inventor: Robert Rodrigues-Ely, 515 St. Laurent Boulevard, Apt. 2011, Ottawa, Ontario, Canada, K1K 3X5

[21] Appl. No.: 105,615

[22] Filed: Aug. 13, 1993

[51] Int. Cl.⁶ .................... A47J 27/04; A47J 36/16
[52] U.S. Cl. .................................... 99/401; 99/447; 126/373; 220/506
[58] Field of Search ............... 99/401, 403, 410, 415, 99/417, 418, 422, 447; 126/348, 373, 387; 220/428, 578, 580, 506

[56] References Cited

U.S. PATENT DOCUMENTS

| | | | |
|---|---|---|---|
| 1,815,569 | 7/1931 | Johnson | 220/580 |
| 3,596,590 | 8/1971 | Harris | 99/447 |
| 3,982,479 | 9/1976 | Sova | 99/447 |
| 5,265,523 | 11/1993 | Mino | 99/403 |

FOREIGN PATENT DOCUMENTS

| | | | |
|---|---|---|---|
| 405260 | 10/1924 | Germany | 126/387 |
| 1306881 | 2/1973 | United Kingdom | 220/580 |

Primary Examiner—David A. Scherbel
Assistant Examiner—Randall E. Chin
Attorney, Agent, or Firm—Marcus & Associates

[57] ABSTRACT

A novel environmental steam energy storage energizer is provided for transferring heat, e.g., to water for use with a heated vessel, e.g., a Dutch oven or a skillet, i.e., to provide an "environmental steam energy storage energizer oven". The environmental steam energy storage energizer includes a cylindrical body which is open both at its top and its bottom, and is constituted by an upper curved peripheral wall, a lower curved peripheral wall and a median floor extend between the curved peripheral walls to form an essential part of the environmental steam energy storage energizer. The median floor provides a trap chamber below the median wall and which is bounded peripherally by the lower curved peripheral wall. At least one pre-determined, fixed-diameter escape aperture is provided in the lower peripheral wall to permit the escape of steam bubbles generated by heating which has been trapped in the trap chamber and to stabilize the environmental steam storage energizer.

13 Claims, 1 Drawing Sheet

ENVIRONMENTAL STEAM ENERGY STORAGE

RELATED INVENTIONS

This application is related to U.S. application Ser. No. 07/696,771, filed May 7, 1991, now abandoned and also is related to U.S. application Ser. No. 07/822,665, filed Jan. 21, 1992, now abandoned.

BACKGROUND OF THE INVENTION (i) Field of the Invention

This invention relates to an environmental steam energy storage method and device which is able to transfer heat originating in heated water in a container for use for many purposes, e.g., to transfer such heat to food products in the water or to beverages dissolved in the water, in an efficient manner and at atmospheric pressure. This invention also relates to such a method and device which is able to transfer heat originating in an empty container directly to a water-containing food product, in a highly efficient manner and at atmospheric pressure. The present invention further relates to methods and devices to provide an environmental steam energy storage zone to transfer hot steam either: firstly, into a heated container containing water or food, including dried vegetables or beverages dissolved in water; or, secondly, into a heated container containing vegetable or animal products, which contain molecular water therein.

(ii) Description of the Prior Art

The traditional water heating system used heretofore loses almost fifty per cent of its efficiency through the water surface of its container. When water molecules are heated by the traditional water heat transfer system they receive two types of heat energy: the water molecules which are heated to a temperature below the boiling point create a hot liquid convection current which rises according to the liquid density laws; the water molecules which are heated to a temperature equal to, or above the boiling point, are subjected to a change of state, creating very hot steam bubbles having a very high temperature, a lower density and a higher upward speed than that of the hot liquid convection current, forming a powerful heat dissipation system.

As a result of this dual production of hot liquid and hot gas, which have different characteristics, a turbulent current brings about the evaporation through the water surface to the atmosphere. The hot liquid convection current brings the hot liquid into direct contact with the atmosphere at the water/atmosphere interface. The consequences of these actions are a great loss of gaseous energy to the atmosphere and a loss of heat energy by conduction.

In an effort to retain such energy in the past, most pots and pans were provided with covers. However, such covers did not achieve the desired result, and were more of an ornament or embellishment. In addition, some pots were covered with hermetically-sealed covers to obtain a super-atmospheric pressure and to increase the temperature. But when heating products in water in such pots some important elements from the products, e.g., vitamins, aromas, etc., were destroyed by the pressure and/or by temperature. Beside such pressure system was expensive and potentially dangerous.

An improvement in the traditional water heat transfer system was provided in the beverage infusion device of British Patent No. 1,436,397, published May 19, 1976 by R. Rodriques-Ely. That British patent provided a beverage infusion device comprising an impermeable float proportioned to cover only a major portion of a water surface in a drinking vessel when floating thereon, and a foraminous bag secured to one side of the float, the bag containing infusible beverage material.

Other different patentees proposed different solutions to such problem. Various arrangements have been contrived to provide an upper seal for vessels contaminating food substances to inhibit the circulation of air at their upper surface as the items or substances are removed from the container. One example of such a seal is shown in U.S. Pat. No. 551,540 issued on Dec. 17, 1895 for "Liquid Dispensing Apparatus". That patent disclosed a float containing, and emitting, a sealing liquid used to shut off the air from liquid in a vessel. The sealing liquid at elevated temperatures, such as would be experienced with heated and reheated liquids, would be inoperable and indeed would contaminate the liquid itself. The liquid container float shown in that patent provided a substantially-different and inferior sealing system from that of the present invention.

Other arrangements have been known in the prior art which disclosed a preserving container including a fruit vessel and the food particles which were further contained in a liquid to further the preservation of the food particles. A follower cover was used to preserve food products through a pressure plate. The follower cover, when weighted down, kept the food particles under the upper surface level of the liquid. The floating lid ordinarily had an escapement opening which would permit gas to pass through the lid and to remain in all cases in contact with the ambient atmosphere contained between the outer and the inner lids used in the combination. This type of prior art device is shown and described, for example, in U.S. Pat. No. 1,948,353 issued on Feb. 20, 1934 to J. L. Lagorio for "Preserving Container".

U.S. Pat. No. 3,987,941 patented Oct. 26, 1976 by A. W. Blessing provided a container for the preparation and preservation of a heated liquid. The container was a cylindrical type container in which the liquid is heated. Means were provided for removing portions of the liquid from the container as it was being used. A follower lid was operable to remain at the upper layer of the liquid as it was being removed from the container, the lid having a weight for maintaining it partially submerged relative to the upper layer of the liquid. A deflectable seal was mounted around the periphery of the liquid.

U S Pat. No 4,723,674 patented Feb. 9 1988 by M. A. Nunes provided a lid for use in combination with a container which included a flexible annular lip which contacted the inner wall of the container and provides a seal between the lid and the walls. The lip included a notch therein which allowed for the expulsion of air from between the lid and the contents of the container. In the closed position, the lid floated on the surface of the container contents.

U.S. Pat. No. 3,974,758 to Stone disclosed the use of a sealed or unsealed follower lid in a straight-walled, pour-type coffee maker.

U.S. Pat. No. 4,907,719 patented Mar. 13, 1990 by G. H. Spotholz et al provided a container for storing, preserving and dispensing flowable comestible products. A floatingly-retained, insulation lid tracked the level of the beverage and prevented oxidation, loss of volatiles and contamination of a beverage container therein.

SUMMARY OF THE INVENTION

(i) Aims of the Invention

An object of the present invention is to create a more efficient method for heating water, food products and beverages by providing a steam energy storage zone in a heating container.

Another object of the present invention is to provide a device which includes a steam energy storage zone therein, such device being usable to heat water, food products and beverages more efficiently.

A still further object of this invention is to provide a device to transfer heat to water, or to food products, or to vegetable products, or to beverages which are dissolved in water, the water being contained in the heated device.

Yet another object of this invention is to provide a device to transfer heat to animal and/or vegetable food products containing molecular water, the animal and/or food products being contained in the heated device.

Yet another object of this invention is to provide a more efficient method to transfer heat to water or to food products, or to beverages dissolved in water or vegetables and/or food products mixed with water, the water being contained in a heated container.

Still another object of this invention is to provide a more efficient method to transfer heat to vegetable and/or animal food products which inherently contain molecular water, the vegetable and/or animal food products being contained in a heated container.

Yet another object of the present invention follows the environmental advice from the contents of the book, "Our Common Future", a book written by the World Commission on Environment and Development, 1987 (Palais Wilson, 52 rue de Paquis, 1201 Genéve, Switzerland).

As a consequence of the above-mentioned objects, the present invention proposes to create a zone, termed herein an "environmental steam energy storage zone", which may be obtained by creating a small and predetermined escape of steam from a heated water zone into the atmosphere using one or more escape apertures, and then finally trapping the greater part of the steam within the heated water zone. This trapped steam provides the steam storage energy zone which is capable of transferring the hot steam more efficiently to matter being heated.

(ii) Statement of Invention

This invention provides an environmental steam energy storage energizer for transferring heat to water for use with a heated vessel. The environmental steam energy storage energizer includes a hollow cylindrical body which is open both at its top and its bottom, the hollow cylindrical body comprising an upper curved peripheral wall and a lower curved peripheral wall; a median floor extending diametrically between the curved peripheral walls, to provide a trap chamber below the median floor, the trap chamber being bounded peripherally by the lower curved peripheral wall; and at least one pre-determined, fixed-diameter aperture extending from the interior of the hollow cylindrical body to the exterior of the hollow cylindrical body. This stabilizes the environmental steam energy storage energizer and permits the controlled escape of gas which has been trapped in a chamber defined by the lower peripheral wall and the median floor. An upstanding member projects upwardly from the median floor. This upstanding member may also be provided with a longitudinal vent therethrough, which vent is adapted to be covered, at selected times, with an insulated security cap the security cap the security cap having apertures therethrough by means of which the vent may be closed or opened.

This invention also provides a method for transferring heat to water or to an aqueous solution for use with a heated vessel comprising the steps of: a) placing water in an open topped vessel; b) placing an environmental steam energy storage energizer, as described above, atop the water, the relationship between the diameter of the environmental steam energy storage energizer and the diameter of the vessel being such that there is an annular space of no more than about 20% of the open top area of the vessel between the environmental steam energy storage energizer and the inner walls of the vessel; c) heating the water; and d) providing at least one escape aperture in the environmental steam energy storage energizer of such a fixed diameter that the area of the escape aperture is from a minimum of about 4 to about 5% to a maximum of about 9 to about 10% of the area of the open top of the vessel.

This invention also provides a method of transferring heat to food products for use with a heated vessel comprising: a) placing a food product to be cooked in an open-topped vessel; b) placing an environmental steam energy storage energizer, as described above, over and surrounding the food, and resting on bottom of the open-topped vessel, the relationship between the diameter of the environmental steam energy storage energizer and the diameter of the vessel being such that there is an annular space of no more than about 20% of the open top area of the vessel between the environmental steam storage energizer and the inner walls of the vessel; c) heating the vessel; and d) providing at least one escape aperture in the environmental steam energy storage energizer of such a fixed controlled diameter that the area of the escape aperture is from a minimum of about 4 to about 5% to a maximum of about 9 to about 10% of the area of the vessel.

In other words, by one embodiment of this invention an environmental steam energy storage energizer, which may or may not float on a liquid, is provided in a heated container. The liquid may be water, or broth, or a beverage, or water mixed with vegetables and/or animal products. The very hot water/steam originates constantly from the change of state of the water and is trapped in the environmental steam energy storage energizer. The trapped water/steam volume is stabilized by the venting through the at least one aperture to the atmosphere. This may be done by providing one or more peripheral apertures of fixed or variable diameter adjacent to the top of the trapped volume. This may additionally be done by providing a longitudinal vent through an upwardly projecting upstanding member. This vent is adapted to be covered at selected times with an insulated security cap, which may have one or more small vents therethrough. In this manner, the greatest part of the water/steam energy is not vented to the atmosphere, but, instead is efficiently transferred to the water, or to the broth, or to the beverage, or to the vegetables and/or animal product. This provides a great saving of energy.

By another embodiment of this invention, the environmental steam energy storage energizer may be used in a manner wherein it does not float on any water, but instead is supported on the bottom of the heated container. The container is loaded with water-containing vegetables and/or water-containing animal products, with no oil or grease or water added. The very hot water/steam originates by virtue of the change of state of the water in the vegetables and/or the animal products.

Thus by this invention, for the first time, an environmental steam energy storage energizer has been provided which efficiently transfers heat from water for various uses, e.g., to cook vegetables and/or animal products.

(iii) Other Features of the Invention

The environmental steam energy storage energizer, which may be in the form of a float forming an essential part of this invention, and/or the vessel may be formed of the transparent, heat-resistant glass known by the trademark PYREX TM, or of the heat-resistant ceramic glass known by the trade-mark VISION TM, or may be formed of aluminum coated with TEFLON TM or with any other heat-resistant plastic resin.

In the environmental steam energy storage energizer, the hollow cylindrical body has a diameter which is less than a diameter of a vessel with which it is used so that there is an annular space of no more than about 20% of the open top area of the vessel between outer walls of the environmental steam energy storage energizer and inner walls of the vessel, the ratio of the total area of the apertures to the area of the open top of a vessel with which it is used being from about 4% to about 10%.

The ratio of the area of the escape apertures to the area of the open top of the vessel is preferably from a minimum of about 4–5% to a maximum of about 9–10%.

(iv) Generalized Description of the Invention

This invention provides an improvement in a method and device to transfer heat to water which is heated in any kind of cookware vessel. The device may be used with any open-topped vessel adapted to contain water to be heated or food to be cooked. This device is an environment steam energy storage energizer specially designed to be able to absorb the turbulent convection current and a great part of the steam energetical potential. This transferred heat may be used to cook water-containing food. In the present invention, the following characteristics are believed to be necessary to provide the environmental steam energy storage energizer which may be a float, or may be a bottom-supported member, namely: it should be a good insulator having great security; it should preferably be transparent; it should have a great heat resistance; and it should provide a stabilization concept.

In one embodiment, the environmental steam energy storage energizer was designed to be cylindrical to have an upper cylindrical wall and a lower cylindrical wall, as well as a median floor, and one or more pre-determined fixed-diameter peripheral escape apertures, leading directly to the atmosphere to stabilize the environmental steam energy storage energizer and to permit the controlled escape of gas trapped in a trap chamber below the median floor. An upstanding member projecting upwardly from the median floor enables manual movement of the environmental steam energy storage energizer, and, if it includes an axial bore, also provides an additional steam vent.

A constant pressure from the liquid convection current is received in the trapping chamber. The steam is trapped between the median floor and the lower peripheral wall. The steam bubbles press against the median floor and attempt to escape. This escape is enabled by one or more pre-determined fixed-diameter escape apertures leading to the atmosphere. In one embodiment, these escape apertures consist only of such peripheral apertures. The main objective of the escape apertures is to stabilize the environmental steam energy storage energizer, which is subjected to the disorderly pressure of the hot liquid convection current pushing the steam. This stabilization point is the most important step to master the trapping chamber concept. Few bubbles escape to the atmosphere. In the meantime, some steam escapes via the annular peripheral escape zone. The largest part of the steam is trapped, forming an environmental steam energy storage energy system, the steam transferring its high temperature to the hot liquid convection current. This creates an absolutely unique improved system to favor an increase of the transfer of heat to water heated in any form of vessel.

In a preferred embodiment of the invention, the environmental steam energy storage energizer is made of the transparent, heat resistant glass known by the trademark PYREX TM, or the heat resistant ceramic glass known by the trademark VISION TM. This insures visibility of the entire system. Another alternative is to form the heating vessel and the environmental steam energy storage energizer from aluminum which is coated with TEFLON TM (a polytetrafluoroethylene polymer) or with a phenolic resin. The environmental steam energy storage energizer includes an integrated top portion, a bottom portion and an energizer system, i.e., one or more apertures directly in communication with the atmosphere. This provides a control of the change of state before boiling. In addition, the venting is done at atmospheric pressure to avoid incipient dangers of the so-called "pressure cooker".

As noted hereinabove, up to the present time, in any water heat transfer, the hot liquid convection current energy was achieved by way of the density laws, while the gaseous energy was achieved by way of the change of state laws. Because of the speed of the rapidly rising gaseous energy, contact with the hot liquid convection current water is very quick, and so the gaseous energy, instead of further heating the hot water, is lost to the atmosphere.

Now, however, by the present heat transfer device (known as an environmental steam energy storage energizer) most of the gaseous heat energy is trapped, and such gaseous heat energy is used continuously to heat the hot water of the convection current. It is believed that such system as described above has not been taught by the prior art.

BRIEF DESCRIPTION OF THE DRAWINGS

In the accompanying drawings.

DESCRIPTION OF PREFERRED EMBODIMENT

Figure 1:
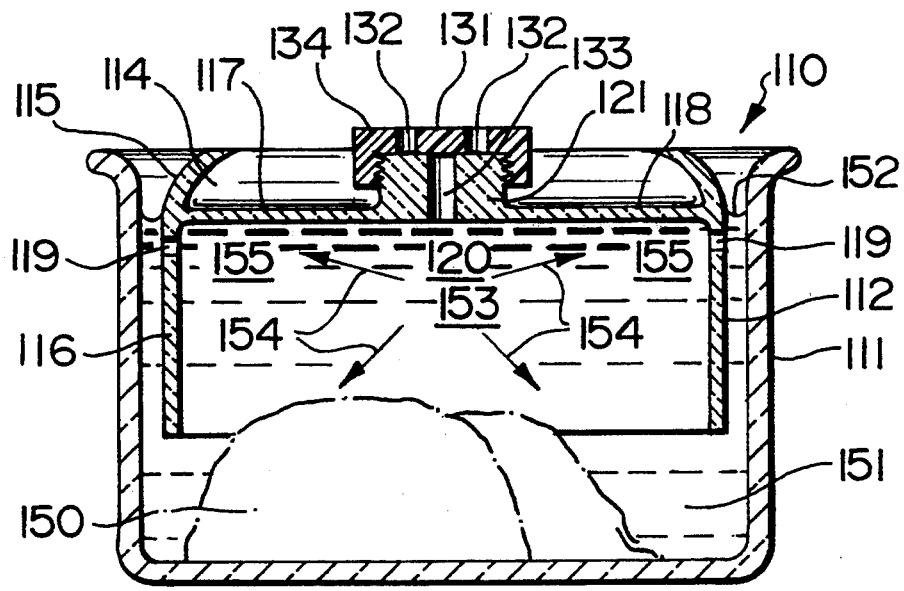
FIG. 1 is a central vertical section through a device of one embodiment of the present invention (in the form of a Dutch oven) including one embodiment of an environmental steam storage energizer.

(i) Description of FIG. 1

One embodiment of the device 110 is an open topped vessel 111, which may be a Dutch oven or any conventional cooking vessel or pot and which may be made of glass, porcelain, or terra cotta; preferably it is formed of the transparent, heat-resistant glass known by the trademark PYREX TM (of Corning Glass) or, the heat-resistant ceramic known by the trademark VISION TM (of Corning Glass) or, of polytetrafluoroethylene coated aluminum, e.g. T-FAL TM -coated aluminum or stainless steel. The device also includes an environmental steam energy storage energizer 112. Environmental steam energy storage energizer 112 is in the form of an open topped cylinder 114 having a curved frusto-conical upper peripheral wall 115, a curved right cylindrical lower peripheral wall 116, and a transverse median wall 117. While the upper peripheral wall 115 is shown to be frusto-conical, or inwardly curved, it may, in fact, be right cylindrical. The upper surface 118 of median wall 117 is exposed to the ambient environment at ambient temperature and pressure. The curved, right cylindrical lower peripheral wall 116 is provided, just below its merging with the median wall 117, with at least one pre-determined, fixed-size, peripheral gas escape aperture 119. Aperture 119 is of pre-determined, cross-sectional area, and is provided for the escape of gases trapped in the trap chamber 120 defined by the lower right cylindrical curved peripheral wall 116 and the median wall 117. A central upstanding member, i.e., stem 121, provided with a longitudinal aperture 133, projects from the upper surface 118 of the median wall 117. The stem 121 is externally-threaded and is provided with an internally-threaded, removable, manually-grippable, insulated cap 134. The cap 134 is provided with two axial apertures 132 for the emergency escape of any gases trapped in chamber 120. Environmental steam energy storage energizer 112 is preferably made of VISION TM or of T-FAL TM -coated aluminum.

Figure 2:
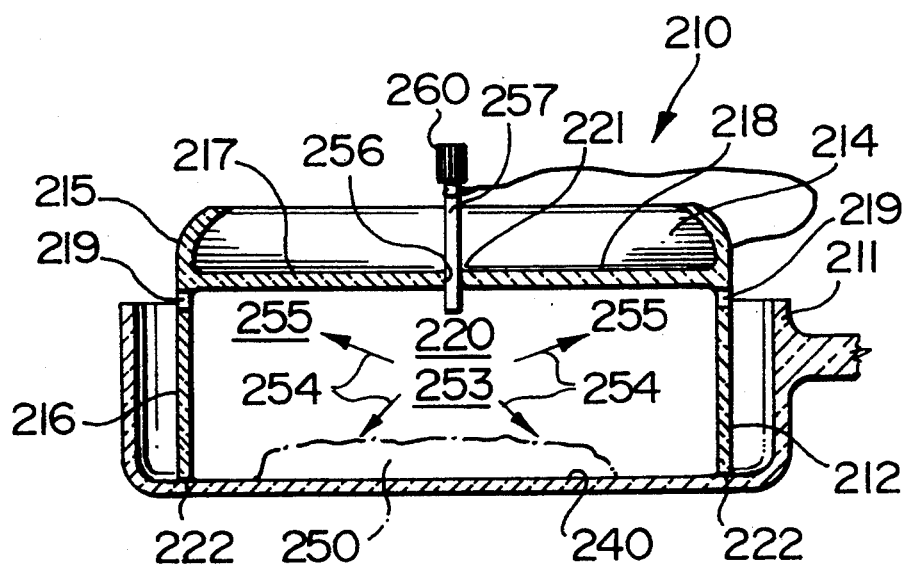
FIG. 2 is a central vertical section through a device of another embodiment of the present invention (in the form of a skillet) including another embodiment of an environmental steam storage energizer of this invention.

(i) Description of FIG. 2

A second embodiment of the device 210 is an open topped skillet 211, which may be made of glass, porcelain, or terra cotta; preferably it is formed of the transparent, heat-resistant glass known by the trade-mark PYREX TM (of Corning Glass) or, the heat-resistant ceramic known by the trademark VISION TM (of Corning Glass) or, of polytetrafluoroethylene coated aluminum, e.g., T-FAL TM -coated aluminum or stainless steel. The device 210 also includes an environmental steam energy storage energizer 212. Environmental steam energy storage energizer 212 is in the form of an open topped cylinder 214 having a curved frustoconical upper peripheral wall 215, a curved right circular lower peripheral wall 216, and a transverse median wall 217. While the upper peripheral wall 215 is shown to be frusto-conical or inwardly curved, it may, in fact, be right cylindrical. The lower periphery 222 of the environmental steam energy storage energizer 212 is adapted to rest on the bottom 210 of the vessel 211. The upper surface 218 of median wall 217 is exposed to the ambient environment at ambient temperature and pressure. Median wall 217 is provided with a central escape aperture 256, which may be linearly plugged with a plug 257 having a gripping knurled end 260. Removal of the plug 257 enables the controlled escape of gases trapped in the trap chamber 220. Environmental steam energy storage energizer 212 is preferably made of VISION TM or of aluminum coated with T-Fal TM .

OPERATION OF PREFERRED EMBODIMENTS

(i). Operation of Embodiment of FIG. 1

In use, the cooking or heating vessel (e.g., a Dutch oven) 111 is loaded with material 150 to be cooked, and a quantity of water 151 is placed therein. The environmental steam energy storage energizer 112 floats atop the water 151 with a peripheral meniscus 152 between the vessel 111 and steam energy storage energizer 112.

When heat is applied to the vessel 111, the water 151 and whatever water is an inherent part of the material being cooked, is heated. Most of the rising steam bubbles and most of the rising hot liquid of a generated convection current are directed to the trap chamber 120, which provides a heat sink reservoir for the very hot steam bubbles and later for a hot liquid convection current. A major amount of the steam bubbles is blocked in such heat sink reservoir, while a controlled minor amount of the gaseous steam is permitted to escape via the peripherally-oriented aperture or apertures 119. Such aperture or apertures provide a total area ranging from a minimum of about 4 to about 5% to a maximum of about 9 to about 10% of the area of the open top of the vessel 110. The rising hot liquid convection current, by virtue of the liquid density law, exerts a pressure on the blocked steam bubbles. This pressure is sufficient to trap the steam bubbles against the median wall 117 of the environmental steam energy storage energizer 112. Because of this action, the rising hot liquid fills the trap chamber 120. A mass of hot water is thus created at 153 within the trap chamber 120. Since the great majority of the steam bubbles is not able to escape to the atmosphere, the steam bubbles release their heat to the hot water at 153 by contact therewith, to be redirected downwardly toward the material 150 being cooked as shown by arrows 154. This provides a new gaseous water mass located between the environmental steam energy storage energizer 112 and the hot liquid water mass 151. The temperature of this new gaseous water mass at 153 finally is stabilized to a pre-determined temperature, which is controllable by suitable selection of the ratio of the area of the apertures 119 compared to the area of the open top of the vessel 111. This hot liquid water mass is sufficient to cook the material efficiently and with a great saving of energy. The upstanding member 121 can be used without the cap 134, in which case the excess steam within trap chamber 120 can escape. Alternatively, with the cap completely on, steam can only escape through peripheral apertures 119. With the cap partially on, a controlled escape of steam also takes place through apertures 132.

(ii) Operation of Embodiment of FIG. 2

In use, the cooking or heating vessel (e.g., a skillet) 211 is loaded with material 250 to be cooked. The environmental steam energy storage energizer 212 is placed in superimposed surrounding relation to the material 250 to be cooked. When heat is applied to the vessel 211 the material to be cooked and water which is a part of the material being cooked is heated and provides steam bubbles. Most of the rising steam bubbles of a generated convection current are directed to the trap chamber 220, which provides a heat sink reservoir for the very hot steam/water and for a convection current. A major amount of the gaseous steam is blocked in such heat sink reservoir, while a controlled minor amount of the gaseous steam is permitted to escape via hollow stem 221 and through the apertures 219. These apertures provide a total area ranging from a minimum of about 4 to about 5% to a maximum of about 9 to about 10% of the open top area of the vessel. The rising hot steam is then blocked against the median wall 217 of the environmental steam energy storage energizer 212. Because of this action, the rising hot steam fills the trap chamber 220. A mass of hot steam is thus created at 253 in the trap chamber 220. Since the great majority of the steam bubbles is not able to escape to the atmosphere, the steam bubbles release their heat at 253 which redirects the heat to the material 250 to be cooked as shown by arrow 254. The temperature of this new gaseous water mass finally is stabilized to a pre-determined temperature, which is controllable by suitable selection of the ratio of the area of the apertures compared to the area of the open top of the vessel. This hot steam mass is sufficient to cook the material 250 efficiently and with a great saving of energy.

During the heating, the amount of steam to escape may be controlled by insertion of the plug 257 into the axial aperture 256 in the median wall 217. Plug 257 may be inserted or removed at will to control steam escape.

(iii) Generalized Operation

By using only the water contents of the vegetable and/or animal products, a higher concentration level of the essential products contained in such products is provided by using such water.

When vegetables and animal products, inherently containing water, are heated in an empty container, a change of state occurs and steam is generated, which tends to escape to the atmosphere. The vegetable and/or animal products is trapped within the environmental steam storage energizer. Such environmental steam energy storage energizer first contains a small pre-determined departure of steam but also provides steam storage ready to energize by contacting the products to be cooked. When the change of state of the water contained in the vegetable and/or animal products occurs, the steam creates the steam storage.

EXAMPLE

A vessel containing 2.8 liters of cold tap water was heated by a traditional electrical heating system using an electrical voltage of 230 volts. The vessel used was also formed of stainless steel. A time of 37 minutes was required to heat the water to a temperature of 190° F. The same vessel was then filled with 2.8 liters of cold tap water from the same tap. An environmental steam energy storage energizer forming an essential part of this invention, and also formed of stainless steel, was placed atop the water and the vessel was heated using the same electrical system having the same voltage. A time of 25 minutes was required to heat the water to 190° F. This comparative test shows a reduction in heating time of 32.4%.

Since the conventional water heating system has an approximate efficiency of 55%, the method of this invention now provides a very much higher efficiency. Such results indicate that even greater improvements are now possible by manufacturing the vessel and the environmental steam energy storage energizer either out of the glass known by the trademark PYREX TM or ceramic known by the trademark VISION TM, or out of a T-FAL TM -coated aluminum or out of the stainless steel known by the trademark RESIST TM.

CONCLUSION

The present new concept for transferring heat to water is based on the principle of directing most of the convection current activity through to an environmental steam energy storage energizer and by controllably directing a very small amount of water/steam to the annular area to create a safety valve, at atmospheric pressure.

Thus, the traditional water heating method which has, for centuries, provided a turbulent convection current losing a great part of its evaporation and conduction energies to the atmosphere by way of very hot steam bubbles, has been controlled. By the method of this invention, a major part of such turbulent convection current activity is controlled and directed to the trap chamber of the environmental steam energy storage energizer. A minor part of the total water/steam is allowed to escape in a controlled manner to the atmosphere, using a pre-selected size of escape apertures.

The present invention provides an energy saving device for people, for electrical utility companies, and for nations. It provides conservation for the environment.

The principle development of the present application is the conservation of energy. The present invention, by improving the water heat transfer efficiency and by being manufactured from glass or ceramic, or of aluminum covered with T-FAL TM ensures the protection of the environment, and minimizes the use of stainless steel resources.

By the present invention, the float has been modified so that not only may the brewing of a cup of tea be improved, but also so the uprising steam may be trapped. This modification and extension enables the use of the environmental steam storage energizer in at least three following cases which are common personal procedures: to heat water and or beverage in a heated water container; to cook vegetable and or animal products in a heated water container; and to cook vegetable and/or animal products in an empty heated container.

The apertures heretofore described enables the controlled escape of steam for the purpose of stabilization.

It is to be observed that the environmental steam energy storage energizer creates a powerful environmental energy saving. Such results are obtained by an extension of the environmental steam energy storage energizer system to create a trap to store very hot and active steam bubbles. This creates firstly a general energetic system of steam comprising a central trap system and a system of opening having a pre-determined value. In addition to such double system, a stabilization system has been created using the stability of the environmental steam energy storage energizer and a pre-determined series of escape openings.

The three examples described above provide a second transfer of heat which creates an environmental steam energy storage energizer located at a pre-determined depth and having a pre-determined position. By this system, no fats or oils are added. The very hot temperature created enable the user to diminish the convention heat level and this provides a considerable energy saving.

The consequences of this lower level of heating energy input are very important. The environmental steam energy storage energizer introduces a second transfer of heat to the cooking which would otherwise be lost. The lower level of heating energy input extends the life of the cookware. Cooking and cooking control are also greatly simplified. This demonstrates a great difference between the conventional transfer of heat while cooking and the transfer of heat by cooking using the environment energizer of this invention.

The advantage of manufacturing the environmental steam energy storage energizer out of VISION ™ is that it provides the advantages of visibility. The advantage of manufacturing the environmental steam storage energizer out of aluminum protected by a coating of a phenolic resin or of T-FAL ™ provides enhanced mechanical advantages. In both cases the environmental steam storage energizer avoids the use of stainless steel.

While it is not desired to be limited to any particular theory, it is believed that cooking of meats using the environmental steam energy storage energizer of the present invention may proceed as follows:

When meat is heated, a change of state occurs, rapidly creating an environmental steam storage zone and the blood emerges from the meat in a very efficient manner. If the meat is frozen, the blood emerges first, followed by water derived from the ice. In this case, a second change of state occurs helping to create the environmental steam storage zone. When the meat is not frozen, the blood emerges first followed by a continuous transfer of heat which is added to the heat already received from the heated vessel. Then the meat is cooked.

The same mechanism is believed to occur with vegetables. Instead of blood, a colored juice emerges. Thus, the use of the environmental steam energy storage energizer results in a separation of the liquid component from the solid component. This separation has not been previously observed using the classical cooking procedures.

It is further believed, without desired to be restricted by any theory, that the use of the environmental steam energy storage energizer with conventional cookware gives rise to what may be called an "environmental steam energy storage energizer oven". Such "environmental steam energy storage energizer oven" may be used in association with a heated vessel containing water mixed with products to be cooked or heated. Alternatively, such "environmental steam energy storage energizer oven" may be used in association with a heated vessel not containing any added water but loaded with vegetables containing molecular water and animal products containing molecular water mixed with blood.

It is still further believed that the "environmental steam energy storage energizer oven" has the following characteristics.

Its efficiency provides each container a clear superiority for efficient heating and cooking.

Its saving of energy follows the characteristics of the "environmental steam energy storage energizer oven" as previously described.

The "environmental steam energy storage energizer oven" has an infinite variability in size, providing a new container of a convenient size and adapted for the intended purpose.

The "environmental steam energy storage energizer oven" is variable in size and has superb mobility.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. An environmental steam energy storage energizer for transferring heat for use with a heated vessel, said environmental steam energy storage energizer comprising: a hollow cylindrical body having a top and a bottom which is open both at said top and said bottom, said hollow cylindrical body comprising an upper curved peripheral wall and a lower curved peripheral wall; a median floor extending diametrically between said curved peripheral walls, to provide a trap chamber below said median floor, said trap chamber being bounded peripherally by said lower curved peripheral wall; and at least one pre-determined, fixed-diameter aperture extending from the interior of said hollow cylindrical body to the exterior of said hollow cylindrical body.

2. The environmental steam energy storage energizer of claim 1 provided with two apertures, each of said apertures leading from said trap chamber through said lower curved, peripheral wall.

3. The environmental steam energy storage energizer of claim 2 wherein said hollow cylindrical body has a diameter which is less than a diameter of a vessel with which it is used so that there is an annular space of no more than about 20% of the open top area of said vessel between said environmental steam energy storage energizer and said vessel; and wherein the ratio of the total area of said apertures to the area of the open top of said vessel with which it is used is from about 4% to about 10%.

4. The environmental steam energy storage energizer of claim 1 which is formed of a transparent heat resistant glass.

5. The combination of the environmental steam energy storage energizer of claim 1 with any cooking vessel.

6. The combination of claim 5, wherein said vessel is a Dutch oven.

7. The combination of claim 5, wherein said vessel is a skillet.

8. The environmental steam energy storage energizer of claim 1 further including an upstanding member projecting from said median floor, said upstanding member including an aperture extending therethrough.

9. The environmental steam energy storage energizer of claim 8 including a cover manually movable to close said aperture or to provide an opening leading from said aperture.

10. The environmental steam energy storage energizer of claim 9, also provided with two apertures, each of said apertures leading from said trap chamber through said lower curved peripheral wall.

11. The environmental steam energy storage energizer of claim 8, also provided with two apertures, each of said apertures leading from said trap chamber through said lower curved peripheral wall.

12. The environmental steam energy storage energizer of claim 1, which is formed of transparent, heat-resistant ceramic.

13. The environmental steam energy storage energizer of claim 1 which is formed of metal coated with a heat-resistant plastic.

* * * * *